(12) United States Patent
Kim et al.

(10) Patent No.: US 11,131,327 B2
(45) Date of Patent: Sep. 28, 2021

(54) GAS LIFT FOR PREVENTING SAGGING

(71) Applicants: HYUNDAI MOTOR COMPANY, Seoul (KR); KIA MOTORS CORPORATION, Seoul (KR)

(72) Inventors: Min-Sik Kim, Seongnam-si (KR); Jong-Il Shin, Busan (KR); Sang-Il Lee, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 64 days.

(21) Appl. No.: 16/689,877

(22) Filed: Nov. 20, 2019

(65) Prior Publication Data

US 2020/0191171 A1    Jun. 18, 2020

(30) Foreign Application Priority Data

Dec. 18, 2018   (KR) ......................... 10-2018-0164225

(51) Int. Cl.
| | | |
|---|---|---|
| *F16F 9/02* | (2006.01) | |
| *F15B 11/12* | (2006.01) | |
| *F15B 11/06* | (2006.01) | |
| *E05C 17/30* | (2006.01) | |

(52) U.S. Cl.
CPC ............ *F15B 11/122* (2013.01); *E05C 17/30* (2013.01); *F15B 11/06* (2013.01); *F16F 9/0254* (2013.01)

(58) Field of Classification Search
CPC .................. F16F 9/0254; F16F 9/0245; F16F 2230/0041; F16B 11/122; E05F 3/221; F15B 11/122

USPC .......................................................... 188/300
See application file for complete search history.

(56) References Cited

U.S. PATENT DOCUMENTS

| | | | | |
|---|---|---|---|---|
| 3,938,793 A | * | 2/1976 | Kaptanis | ............... F16F 9/0254 |
| | | | | 267/120 |
| 4,458,887 A | * | 7/1984 | Shimokura | ............ F16F 9/0254 |
| | | | | 188/300 |
| 4,867,317 A | * | 9/1989 | Wildemann | ............. E05C 17/30 |
| | | | | 267/64.12 |
| 4,920,609 A | * | 5/1990 | Lin | ........................ E05C 17/085 |
| | | | | 16/66 |
| 8,844,910 B2 | * | 9/2014 | Krajenke | ............... E05F 1/1091 |
| | | | | 267/64.12 |

FOREIGN PATENT DOCUMENTS

| | | | | |
|---|---|---|---|---|
| DE | 102018118306 A1 | * | 1/2020 | ............ F16F 9/0254 |
| FR | 2500898 A1 | * | 9/1982 | ................ F16F 9/49 |
| GB | 1529171 A | * | 10/1978 | ............ F16F 9/0254 |

(Continued)

*Primary Examiner* — Thomas J Williams
(74) *Attorney, Agent, or Firm* — McDonnell Boehnen Hulbert & Berghoff LLP

(57) ABSTRACT

A gas lift for preventing sagging may include in the gas lift comprising a tube and a rod slidably installed inside the tube, and filled with gas inside the tube, a moving member for moving with the rod when the rod slides at one side of the portion received inside the tube of the rod, a first stopping part coupled to the moving member and for stopping sliding of the moving member primarily in the tube, and a second stopping part coupled to the moving member and for stopping sliding of the moving member after the moving member and the first stopping part have been coupled to each other.

9 Claims, 15 Drawing Sheets

(56) References Cited

FOREIGN PATENT DOCUMENTS

| | | | | |
|---|---|---|---|---|
| GB | 2310908 A | * | 9/1997 | ............ F16F 9/0245 |
| JP | 56167941 A | * | 12/1981 | ............ F16F 9/0254 |
| KR | 10-1468813 B1 | | 12/2014 | |

* cited by examiner

GAS LIFT FOR PREVENTING SAGGING

CROSS-REFERENCE TO RELATED APPLICATION

This application claims priority to Korean Patent Application No. 10-2018-0164225, filed on Dec. 18, 2018, which is incorporated herein by reference in its entirety.

BACKGROUND

Field of the Disclosure

The present disclosure relates to a gas lift for supporting a hood of a vehicle, and more particularly, to a gas lift for preventing sagging, which prevents a hood from being closed by compressing a gas lift by the self-weight of the hood even if gas is leaked.

Description of Related Art

A vehicle is provided with a hood, a tailgate, etc. for maintaining various devices installed in an engine room of the vehicle, or for loading loadings in the vehicle.

When the hood and the tailgate are opened by the user, a gas lift for supporting the hood and the tailgate is installed with respect to a vehicle body in order to maintain the opened state. FIG. 1 illustrates a configuration in which a gas lift 110 has been installed in a vehicle 1 in order to support a hood 3.

The gas lift maintains a state where the gas lift 110 has been extended in a state where the hood and the tailgate have been opened, thereby maintaining the state where the hood and the tailgate have been opened.

FIG. 2 illustrates a technique in which the gas lift 110 has been applied in order to support the hood 3. When the user lifts up the hood 3 only to a certain point by a tube 111 filled with gas therein and a rod 112 slidably installed inside the tube 111 in the gas lift 110, the gas lift 110 lifts up the hood 3 while pushing the rod 112 by a pressure of the gas with respect to the residual section so that the hood 3 is fully opened.

As illustrated in FIG. 2, such a structure of the gas lift 110 includes the tube 111, the rod 112 slidably installed inside the tube 111, a piston 113 installed at the lower end (end portion disposed inside the tube) of the rod 112, a plurality of disks 114, 116 and a piston ring 115 installed at the front and the rear of the piston 113 and for restricting the position of the piston 113 or air-tightening the gas, a rod guide 117 installed inside the upper end of the tube 111 and for restricting the eccentricity of the rod 112, a packing 119 for preventing the leakage of the gas at the upper end of the tube 111, and a chamber 118 for receiving lubricant therein.

There is a problem in that the gas lift 110 has a structure in which the rod 112 performs a simple linear motion according to the pressure of the gas with respect to the tube 111, such that when the gas inside the gas lift 110 is leaked, a supporting force is weakened when the hood 3 is opened. When the supporting force is weakened by the leakage of the gas, the opening amount of the hood 3 is reduced by the self-weight of the hood 3 or the hood 3 falls in the state where the hood 3 has been opened. In order to solve the above problems, the gas lift 110 is installed in plural, for example, with two at both left and right sides thereof to maintain the supporting force even if the gas is leaked. However, there is a problem in that the gas lift 110 is installed in plural, thereby increasing the cost.

The contents described in Description of Related Art are to help the understanding of the background of the present disclosure, and can include what is not previously known to those skilled in the art to which the present disclosure pertains.

SUMMARY

The present disclosure is intended to solve the above problems, and an object of the present disclosure is to provide a gas lift for preventing sagging, which prevents shrinkage caused by leakage of gas, etc. regardless of the user's intention in a state of having supported a hood, thereby increasing convenience and reliability at operation.

A gas lift for preventing sagging according to the present disclosure for achieving the object includes, in the gas lift including a tube and a rod slidably installed inside the tube, and filled with gas inside the tube, a moving member for moving with the rod when the rod slides at one side of the portion received inside the tube of the rod, a first stopping part coupled to the moving member and for stopping sliding of the moving member primarily in the tube, and a second stopping part coupled to the moving member and for stopping sliding of the moving member after the moving member and the first stopping part have been coupled to each other.

The moving member is formed with a tubular part fixed to the rod, and a coupling part coupled to the first stopping part and the second stopping part sequentially on the upper portion of the tubular part.

The first stopping part is a coupling protrusion formed to be protruded from the inside surface of the tube and coupled to the outside surface of the moving member.

The coupling protrusion is formed by caulking-processing the outside surface of the tube.

An inlet part formed on the upper portion of the coupling part is formed to be recessed from the outside surface of the tubular part along the circumference thereof on the upper end of the tubular part.

The upper end of the inlet part is formed to be spaced to have a gap from the inside wall of the tube so that the inlet part can enter the coupling protrusion.

The second stopping part is a stopping member fixedly installed to be disposed at the upper end than the moving member inside the tube.

The stopping member includes a main body, an entrance part formed to have a smaller cross-sectional area toward the lower end thereof so that the moving member easily enters on the lower portion of the main body, and a protruding part formed to be protruded along the circumference of the main body on the outside surface of the main body to be coupled to the coupling part.

The coupling part is formed to be coupled to the coupling protrusion and the protruding part sequentially.

The lower end of the coupling part is formed to be inclined toward the center of the rod.

The tubular part has the outside surface formed to be spaced to have a gap from the inside surface of the tube.

A portion where the inlet part and the coupling part are coupled to each other is formed to be inclined.

An interval between the protruding part and the coupling protrusion is formed so that the outside circumference of the coupling part is supported by the coupling protrusion when the coupling part is coupled to the protruding part.

According to the gas lift for preventing sagging of the present disclosure having the above configuration, it is possible to prevent the hood from falling by shrinkage of the gas lift caused by the self-weight of the hood even if the gas is leaked.

It is possible to prevent the hood from falling due to the leakage of the gas, thereby solving the problem that the worker is injured by falling of the hood regardless of the intention at the time of vehicle maintenance.

In addition, it is not required to install a plurality of gas lifts for preventing the hood from falling due to the leakage of the gas, thereby reducing the manufacturing cost and the weight of the vehicle.

DETAILED DESCRIPTION

Hereinafter, a gas lift for preventing sagging according to the present disclosure will be described in detail with reference to the accompanying drawings.

Figure 1:
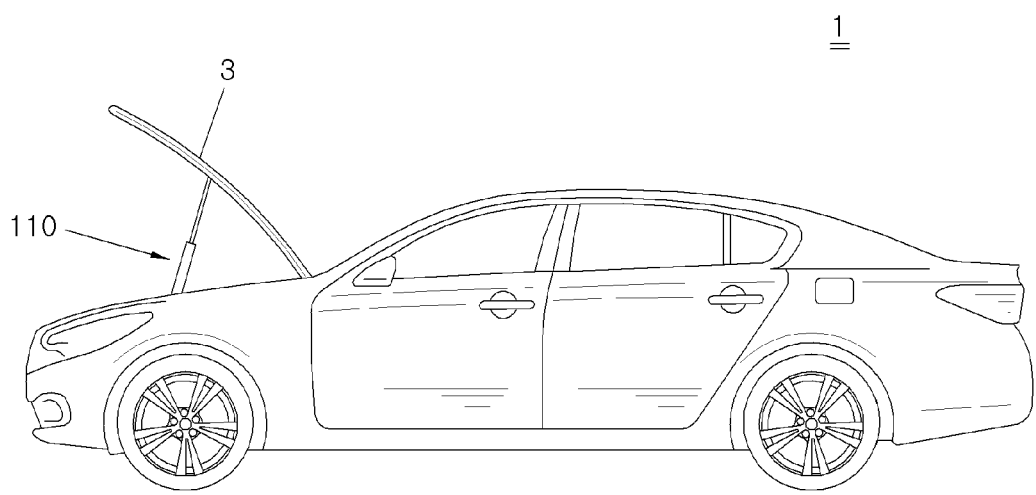
FIG. 1 is a side diagram illustrating the state where a gas lift according to the related art supports a hood of a vehicle.
Figure 2:
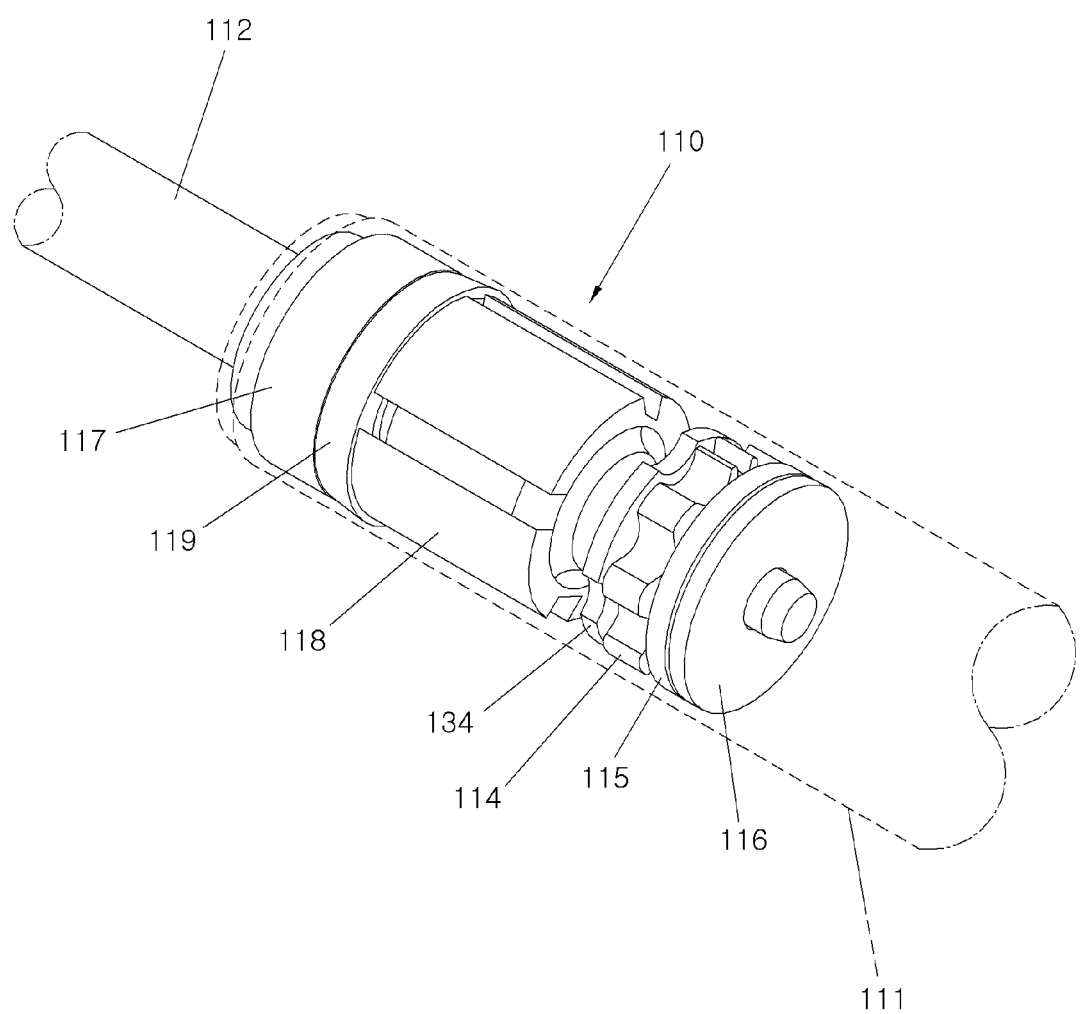
FIG. 2 is a projection perspective diagram illustrating a structure of the gas lift according to the related art.
Figure 3:
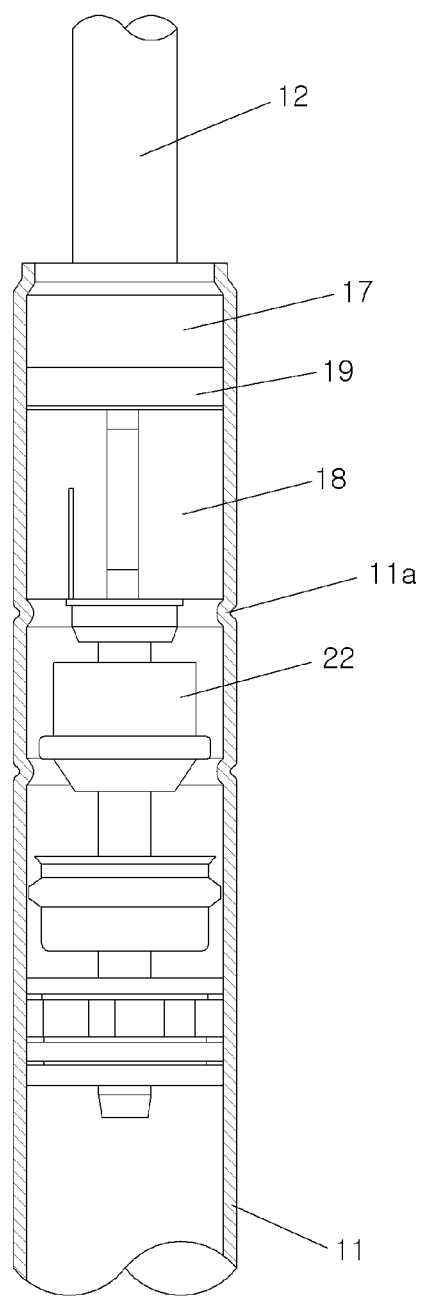
FIG. 3 is a projection perspective diagram illustrating a gas lift for preventing sagging according to the present disclosure.
Figure 4:
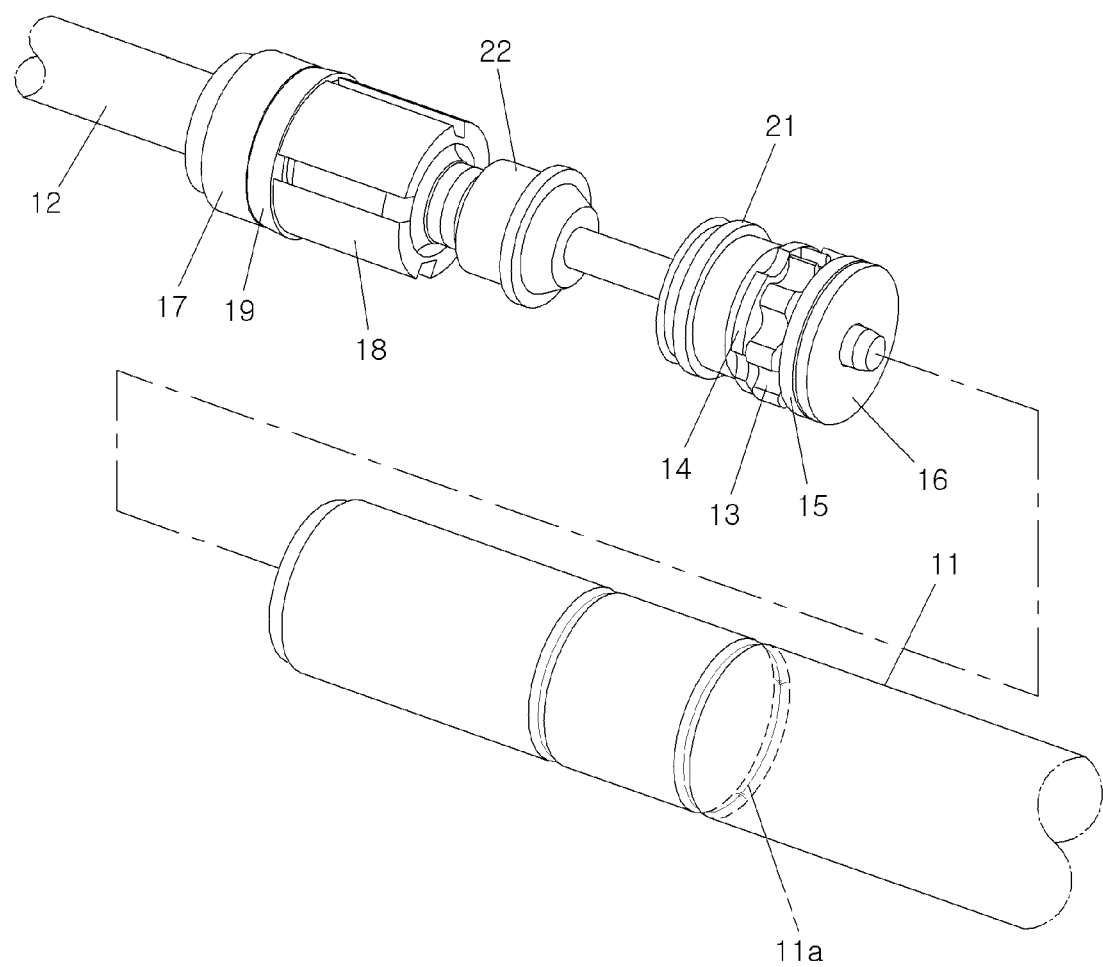
FIG. 4 is an exploded perspective diagram illustrating the gas lift for preventing sagging according to the present disclosure.

As illustrated in FIGS. 3 and 4, a gas lift for preventing sagging according to the present disclosure includes, in the gas lift including a tube 11 and a rod 12 slidably installed inside the tube 11, and filled with gas inside the tube 11, a moving member 21 for moving with the rod 12 when the rod 12 slides at one side of the portion received inside the tube 11 of the rod 12, a first stopping part coupled to the moving member 21 and for stopping sliding of the moving member 21 primarily in the tube 11, and a second stopping part coupled to the moving member 21 and for stopping sliding of the moving member 21 after the moving member 21 and the first stopping part have been coupled to each other.

In the gas lift 10 including the tube 11 and the rod 12 slidably installed inside the tube 11, and filled with gas inside the tube 11, the rod 12 is not inserted into the tube 11, and the state where the length of the gas lift 10 has been increased is maintained even if the gas is leaked in the tube 11 and the rod 12, thereby solving the problem in that the hood 3 of the vehicle falls regardless of the user's intention upon the leakage of the gas.

In the present disclosure, in order to prevent occurrence of sagging of the gas lift 10 caused by the leakage of the gas, the gas lift 10 installs the moving member 21 at the rod 12, and includes the first stopping part coupled to the moving member 21 and for primarily stopping the rod 12 from being inserted into the tube 11 in a state where the rod 12 has maximally been drawn out from the tube 11 in the tube 11, and the second stopping part for stopping it secondarily.

The gas lift 10 of the present disclosure includes a basic structure of the gas lift 10. The gas lift 10 has the rod 12 slidably installed inside the tube 11. A piston 13 for restricting the movement of gas and allowing the rod 12 to maintain the center thereof is installed at the end portion of the rod 12 that is inserted into the tube 11. A plurality of disks 14, 16 and a piston ring 15, which are installed at the front and the rear of the piston 13 and for restricting the position of the piston 13 or air-tightening the gas, are installed therein. In addition, a rod guide 17 for restricting the eccentricity of the rod 12, a packing 19 for preventing the leakage of the gas at the upper end of the tube 11, and a chamber 18 for receiving lubricant therein are installed inside the upper end of the tube 11.

Figure 5A:
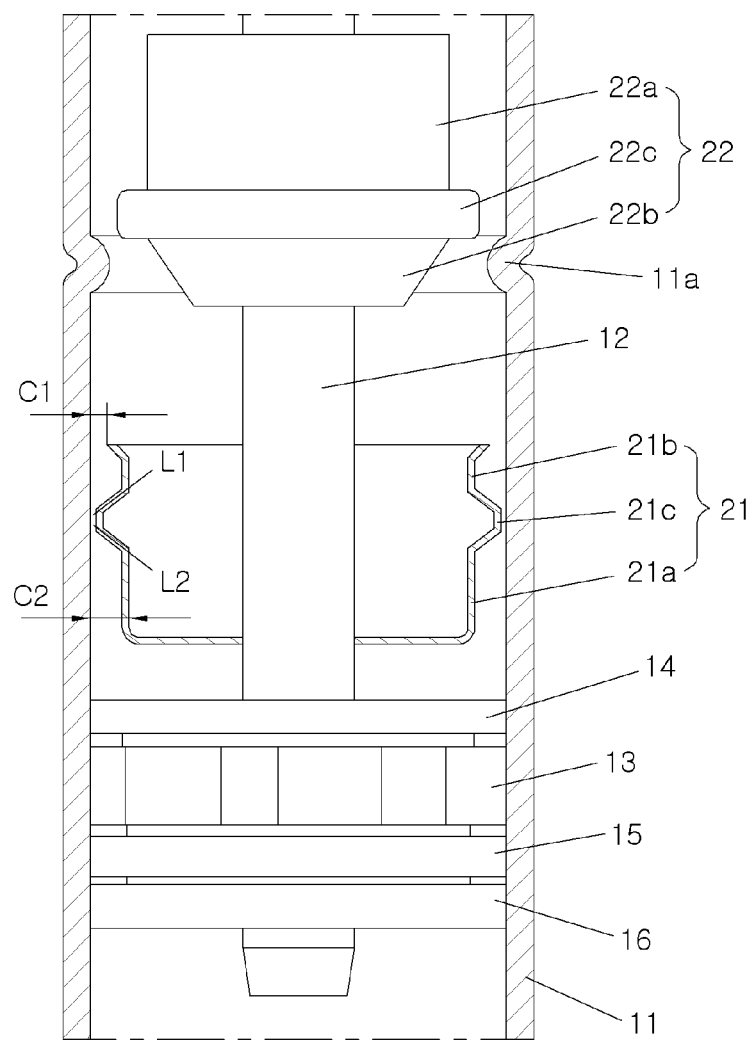
FIGS. 5A, 5B, and 5C are cross-sectional diagrams illustrating the states according the movement of a moving member.
Figure 5B:
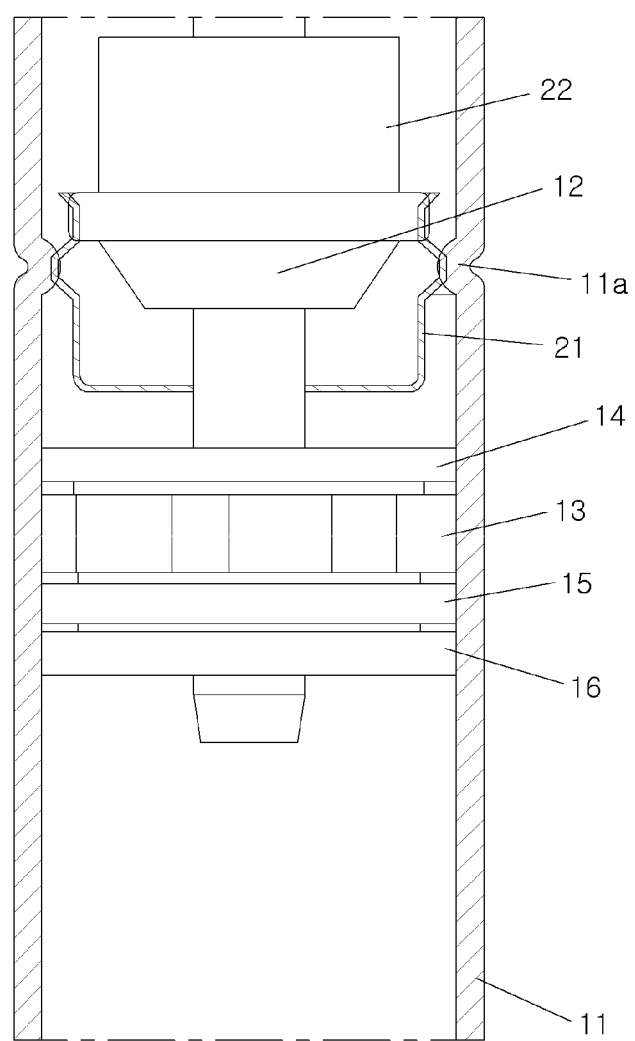
Figure 5C:
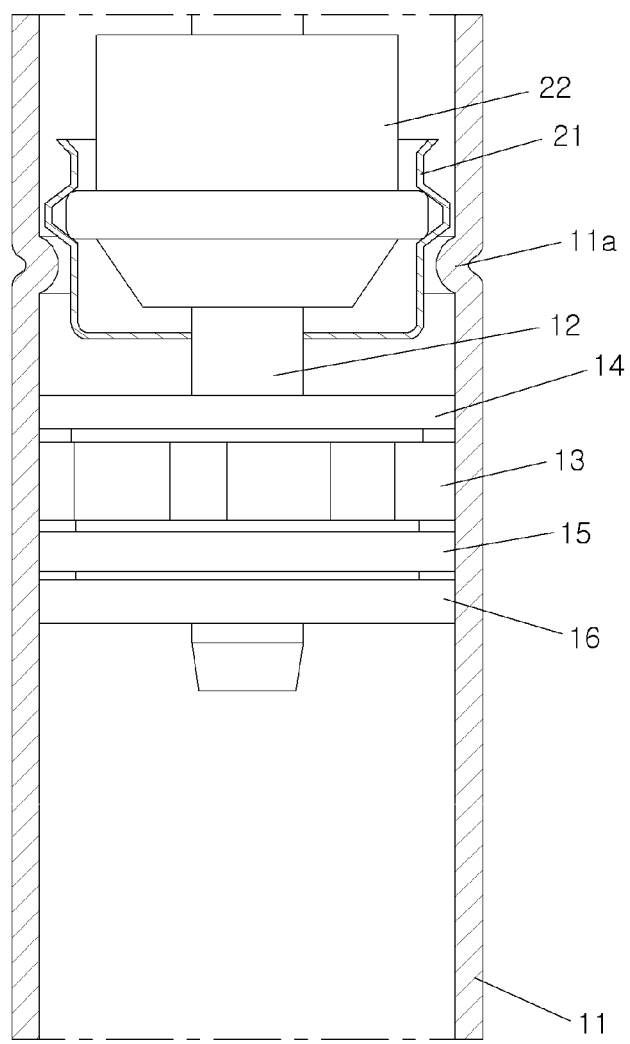

Referring to FIGS. 5A, 5B, and 5C, the moving member 21 has a coupling part 21c formed on the upper portion thereof to be coupled to the first stopping part and the second stopping part sequentially, thereby stopping the rod 12 from being inserted into the tube 11.

The moving member 21 is formed in a tubular shape having a hollow interior to have the lower end closed to be fixed to the rod 12 and have the upper end formed in the opened state.

The moving member 21 is formed with a tubular part 21a having the lower end fixed to the rod 12 and having the upper end formed to be opened, and the coupling part 21c and an inlet part 21b at the upper end of the tubular part 21a sequentially. The moving member 21 is formed to have the overall cross-sectional structure of a U-shape by forming the tubular part 21a in the tubular shape having the upper end opened and having the lower end closed.

The inlet part 21b is formed along the circumference of the upper end of the tubular part 21a. The inlet part 21b is formed to be recessed from the outside surface of the tubular part 21a and to be convex toward the rod 12 (recessed toward the tube).

The coupling part 21c is formed to be convex in a direction opposite to the inlet part 21b on the lower portion of the inlet part 21b. For example, the coupling part 21c is formed to be convex toward the tube (recessed toward the rod).

The first stopping part can become a coupling protrusion 11a formed on the inside surface of the tube 11.

The coupling protrusion 11a is formed along the circumferential direction of the tube 11 on the inside surface of the tube 11. The coupling protrusion 11a is formed at a predetermined height from the inside surface of the tube 11, such that the coupling protrusion 11a is coupled to the coupling part 21c of the moving member 21 that slides in the state fastened to the rod 12, thereby primarily stopping the rod 12 from being inserted into the tube 11.

In addition, when the coupling part 21c of the moving member 21 is coupled to the second stopping part, the coupling protrusion 11a further supports the outside circumference of the coupling part 21c, thereby preventing sagging of the rod 12.

The coupling protrusion 11a can be formed by caulking-processing the tube 11.

The second stopping part can become a stopping member 22 installed at the fixed position inside the tube 11.

The stopping member 22 includes a main body 22a, an entrance part 22b formed on the lower portion of the main body 22a and for allowing the moving member 21 to be inserted easily, and a protruding part 22c formed to be protruded along the circumference of the main body 22a.

The main body 22a is formed to have a hollow interior and formed so that the rod 12 passes through.

The lower portion of the main body 22a is formed with the entrance part 22b formed to have a smaller cross-sectional area toward downward so that the moving member 21 easily moves.

The protruding part 22c is formed at a predetermined height along the circumference of the main body 22a on the outside surface of the main body. The protruding part 22c is coupled to the coupling part 21c, thereby preventing the rod 12 from being inserted into the tube 11.

Since the coupling protrusion 11a is formed to be protruded toward the center of the tube 11 from the inside surface of the tube 11, the coupling protrusion 11a can be coupled to the coupling part 21c, which is formed to be convex toward the coupling protrusion 11a. According to such a structure, the rod 12 can be prevented from sagging primarily.

Meanwhile, the moving member 21 is formed to easily contact with or to be separated from the coupling protrusion 11a and the protruding part 22c when contacting with or being separated from them.

That is, as illustrated in FIG. 5A, the inlet part 21b is formed to have a gap C1 from the inside surface of the tube 11, such that the inlet part 21b can easily enter the coupling protrusion 11a when the rod 12 is separated from the tube 11.

In addition, when the rod 12 is drawn out, an inclination (see a line L1 of FIG. 5A) is formed between the inlet part 21b and the coupling part 21c so that the coupling part 21c is easily coupled to the protruding part 22c while the inlet part 21b is separated from the coupling protrusion 11a. This makes so that the coupling part 21c is easily coupled to the coupling protrusion 11a while being separated from the protruding part 22c when the rod 12 is inserted into the tube 11. Then, the bottom surface of the coupling part 21c is also formed to be inclined (see a line L2 of FIG. 5A), such that the coupling part 21c can easily pass through the coupling protrusion 11a when the rod 12 is inserted into the tube 11.

In addition, the outside surface of the tubular part 21a is formed to have a gap C2 from the inside surface of the tube 11, such that the coupling part 21c is easily separated from the protruding part 22c when the rod 12 is inserted into the tube 11.

The coupling protrusion 11a of the tube 11 and the protruding part 22c of the stopping member 22 are formed to have a predetermined distance therebetween. The coupling protrusion 11a and the protruding part 22c are formed so that the outside circumference of the coupling part 21c is supported by the coupling protrusion 11a upon the secondary coupling of the moving member 21, that is, when the coupling part 21c has been held by the protruding part 22c.

Therefore, upon the secondary coupling of the moving member 21 (when the coupling part and the protruding part have been coupled to each other), the moving member 21 is coupled to the stopping member 22 by the coupling of the coupling part 21c and the protruding part 22c, and in addition, the coupling part 21c is supported by the coupling protrusion 11a, thereby having a double-coupled structure.

The moving member 21 and the stopping member 22 can be made of a material of synthetic resin. For example, they can be molded by using a material of a mixture of polyamide, glass fiber, and polytetrafluoroethylene. In particular, a material of a mixture of Poly Amide 46 (PA46), Glass Fiber 30 (GF30), and polytetrafluoroethylene (PTFE) can be used.

The gas lift 10 for preventing sagging according to the present disclosure having the above configuration is installed between the hood 3 and a vehicle body 2 in the vehicle 1. The upper end of the rod 12 is hinge-connected to the bottom surface of the hood 3, and the lower end of the tube 11 is hinge-connected to the vehicle body 2, thereby stopping the hood 3 from falling even if the gas is leaked.

An operation of the gas lift for preventing sagging according to the present disclosure having the above configuration will be described as follows.

In the present disclosure, the user lifts up and opens the hood 3 or presses down and closes the hood 3, such that the length of the gas lift 10 can be increased or reduced, thereby maintaining the state where the hood 3 has been supported or the length of the gas lift 10 has been reduced.

FIGS. 6A, 6B, 6C and 6D sequentially illustrate the states where the length of the gas lift 10 of the present disclosure is increased.

Figure 6A:
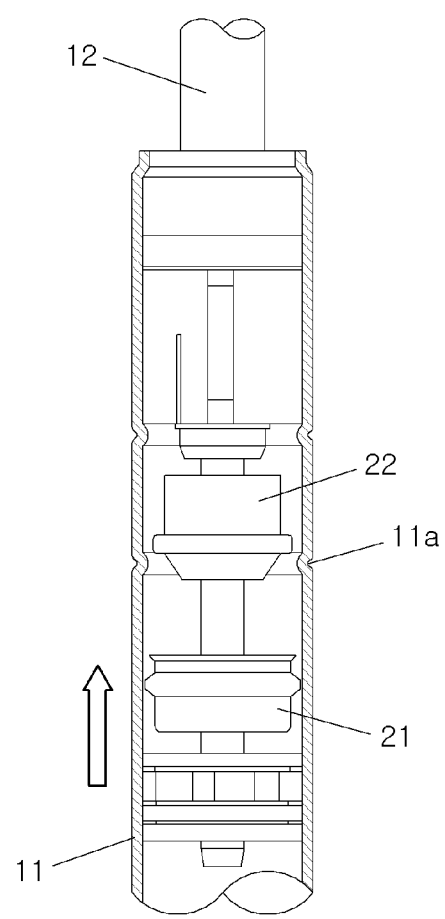
FIGS. 6A, 6B, 6C, and 6D are diagrams illustrating a procedure in which the length of the gas lift for preventing sagging according to the present disclosure is increased.
Figure 6B:
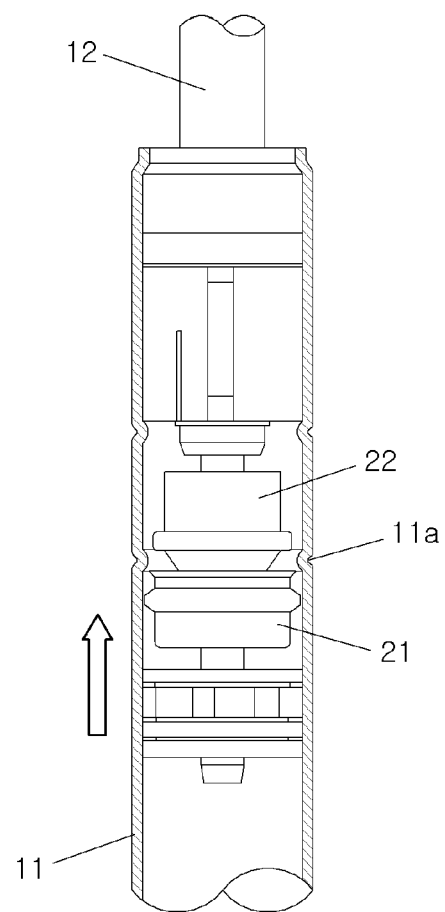

When the user starts lifting up the hood 3, the rod 12 starts to be drawn out from the tube 11 (FIG. 6A).

Figure 6C:
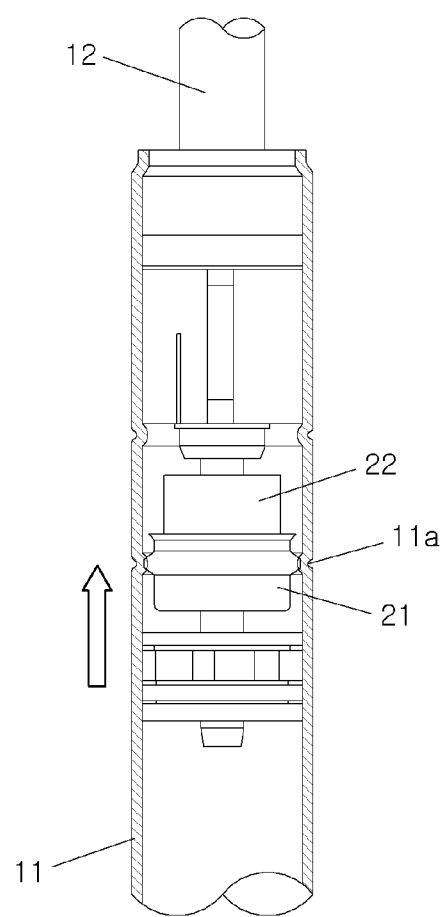

After the rod 12 is drawn out and the front end of the moving member 21 reaches the coupling protrusion 11a (FIG. 6B), when a load lifting up the hood 3 continues to operate, the coupling part 21c of the moving member 21 is coupled to the coupling protrusion 11a. When the coupling part 21c is coupled to the coupling protrusion 11a, the rod 12 is primarily coupled to the tube 11 (FIGS. 5B and 6C). The rod 12 is not inserted by the self-weight of the hood 3 even when the coupling part 21c is coupled to the coupling protrusion 11a, thereby preventing sagging of the gas lift 10.

Figure 6D:
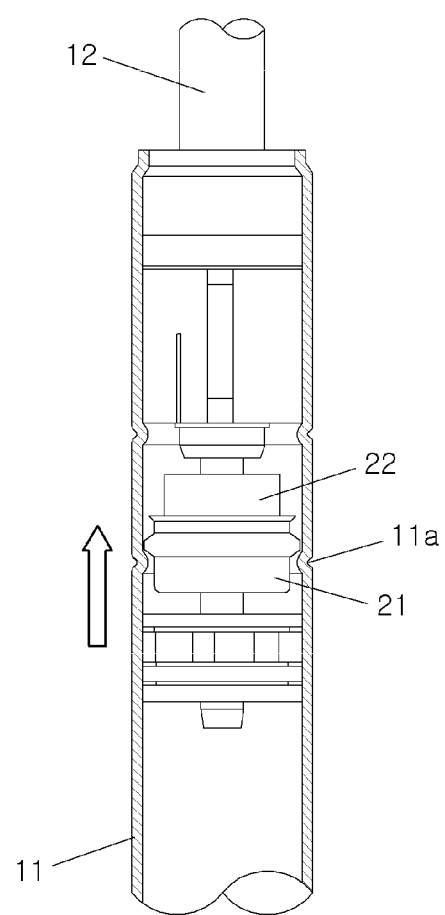

Thereafter, while the rod 12 and the moving member 21 are further drawn out from the tube 11 together when lifting up the hood 3 continuously, the coupling part 21c is separated from the coupling protrusion 11a upwardly, and the coupling part 21c is coupled to the protruding part 22c of the stopping member 22. The coupling part 21c is coupled to the protruding part 22c, such that the rod 12 is secondarily coupled to the tube 11 (FIGS. 5C and 6D).

In particular, when the coupling part 21c is coupled to the protruding part 22c, the outside circumference of the coupling part 21c is supported by the coupling protrusion 11a, such that the rod 12 is doubly coupled to the tube 11. That is, the coupling part 21c is coupled in the form of holding the protruding part 22c and at the same time, the outside circumference of the coupling part 21c is supported by the coupling protrusion 11a. Therefore, the rod 12 is coupled to the tube 11 until an external force capable of releasing the primary coupling and the secondary coupling is applied to the tube 11, thereby preventing sagging.

Meanwhile, FIGS. 7A, 7B, 7C and 7D sequentially illustrate the states where the length of the gas lift 10 according to the present disclosure is reduced. As illustrated in FIGS. 7A, 7B, 7C and 7D, they operate in reverse order in which the length of the gas lift 10 is increased.

The coupling part 21c of the moving member 21 is held by the protruding part 22c of the stopping member 22 and in addition, when the user presses the hood 3 downwardly in the state of being supported by the coupling protrusion 11a (FIGS. 5C and 7A), the rod 12 starts moving into the tube 11. Since the coupling part 21c of the moving member 21 is held by the protruding part 22c of the stopping member 22 and is also supported by the coupling protrusion 11a, the coupling part 21c is separated from the protruding part 22c to move the moving member 21 downwardly when a force of pressing the hood 3 operates greater than a force at which the coupling part 21c is coupled to the protruding part 22c and the coupling protrusion 11a.

Figure 7A:
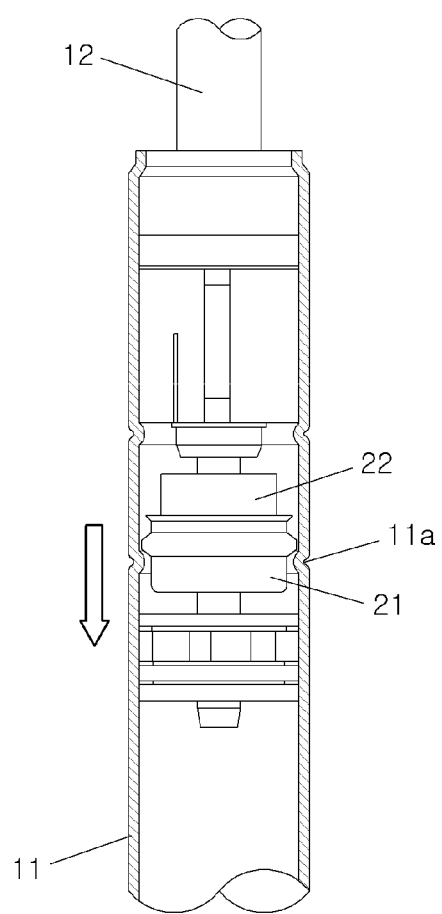
FIGS. 7A, 7B, 7C, and 7D are diagrams illustrating a procedure in which the length of the gas lift for preventing sagging according to the present disclosure is reduced.
Figure 7B:
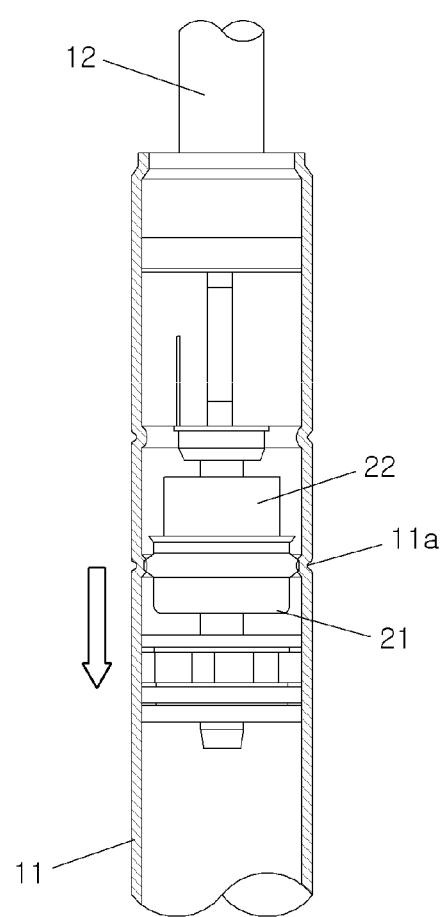

Thereafter, the coupling part 21c of the moving member 21 is coupled to the coupling protrusion 11a again, thereby stopping the rod 12 from being inserted into the tube 11 once more (FIGS. 5B and 7B).

Figure 7C:
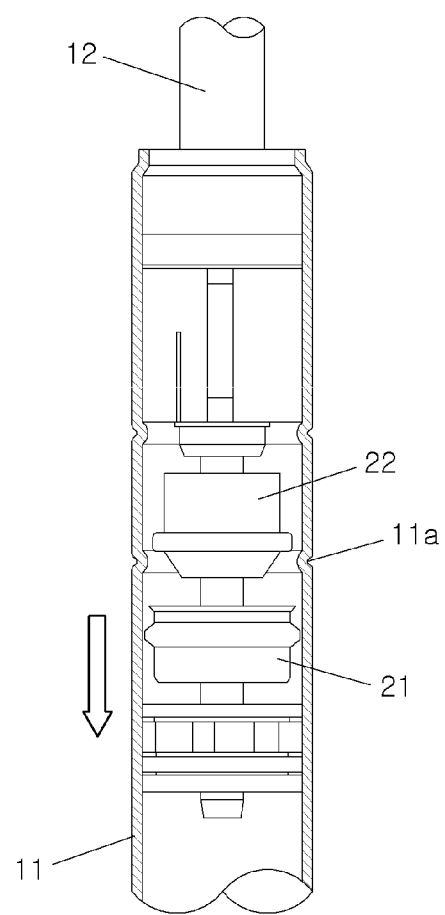

When the user continues to pull down the hood 3 in order to close the hood 3, the inlet part 21b of the moving member 21 is separated from the coupling protrusion 11a (FIG. 7C).

Figure 7D:
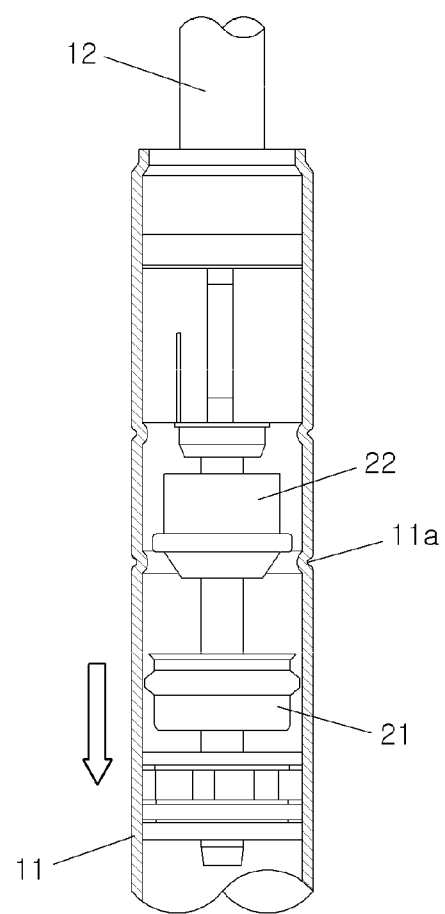

Thereafter, since there is no configuration of stopping the rod 12 from falling (insertion into the tube), the hood 3 falls by the self-weight of the hood 3 (FIG. 7D).

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A gas lift for preventing sagging, comprising:
the gas lift comprising a tube and a rod slidably installed inside the tube, and filled with gas inside the tube,
a moving member for moving with the rod when the rod slides at one side of a portion received inside the tube of the rod,
a first stopping part coupled to the moving member and for stopping sliding of the moving member primarily in the tube, and
a second stopping part coupled to the moving member and for stopping sliding of the moving member after the moving member and the first stopping part have been coupled to each other;
wherein the moving member is formed with a tubular part fixed to the rod, and a coupling part coupled to the first stopping part and the second stopping part sequentially on an upper portion art;
wherein the first stopping part is a coupling protrusion protruding from an inside surface of the tube, and coupled to an outside surface of the moving member;
wherein the second stopping part is a stopping member fixedly installed at an upper end of the moving member inside the tube; and
wherein the stopping member comprises a main body, an entrance part having a smaller cross-sectional area toward a lower end thereof so that the moving member easily connects to a lower portion of the main body, and a protruding part protruding along a circumference of the main body on an outside surface of the main body to be coupled to the coupling part.

2. The gas lift for preventing sagging of claim 1,
wherein the coupling protrusion is formed by caulking-processing the outside surface of the tube.

3. The gas lift for preventing sagging of claim 1,
wherein an inlet part formed on the upper portion of the coupling part is recessed from the outside surface of the tubular part along a circumference thereof on an upper end of the tubular part.

4. The gas lift for preventing sagging of claim 3,
wherein the upper end of the inlet part is spaced to have a gap from an inside wall of the tube so that the inlet part can enter the coupling protrusion.

5. The gas lift for preventing sagging of claim 3,
wherein a portion where the inlet part and the coupling part are coupled to each other is inclined.

6. The gas lift for preventing sagging of claim 1,
wherein the coupling part is coupled to the coupling protrusion and the protruding part sequentially.

7. The gas lift for preventing sagging of claim 6,
wherein the lower end of the coupling part is inclined toward a center of the rod.

8. The gas lift for preventing sagging of claim 1,
wherein the tubular part has the outside surface spaced to have a gap from the inside surface of the tube.

9. The gas lift for preventing sagging of claim 1,
wherein an interval between the protruding part and the coupling protrusion is formed so that the outside circumference of the coupling part is supported by the coupling protrusion when the coupling part is coupled to the protruding part.

\* \* \* \* \*